Figure 1:
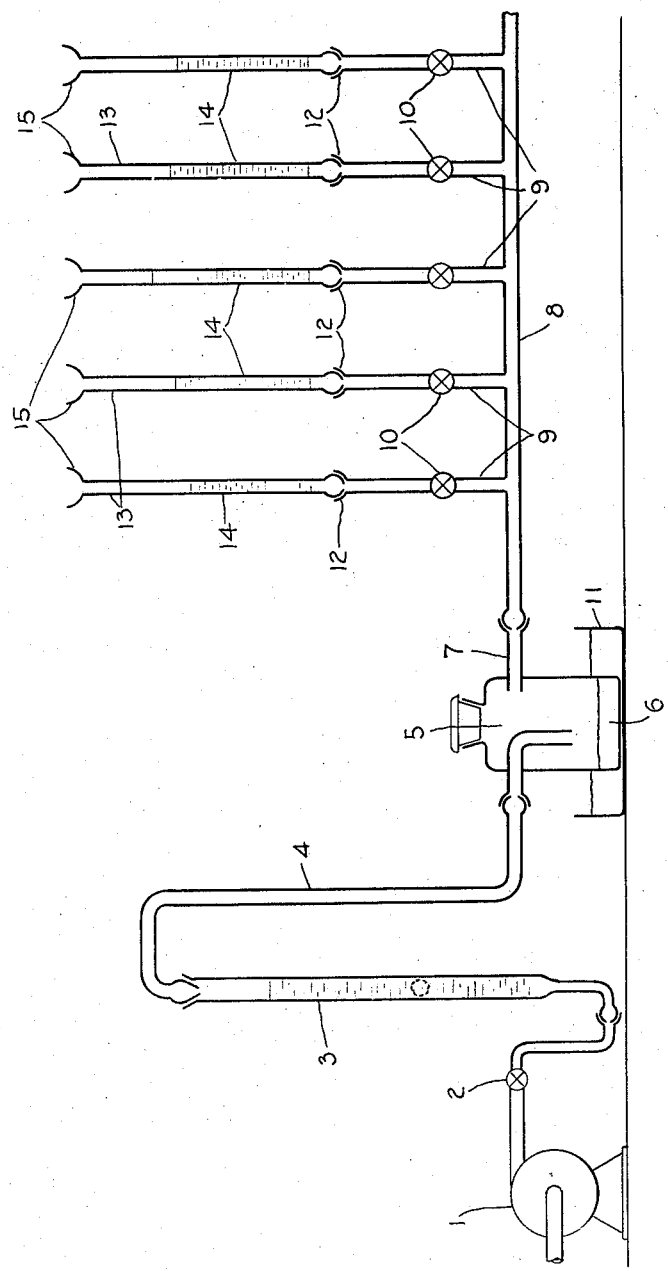

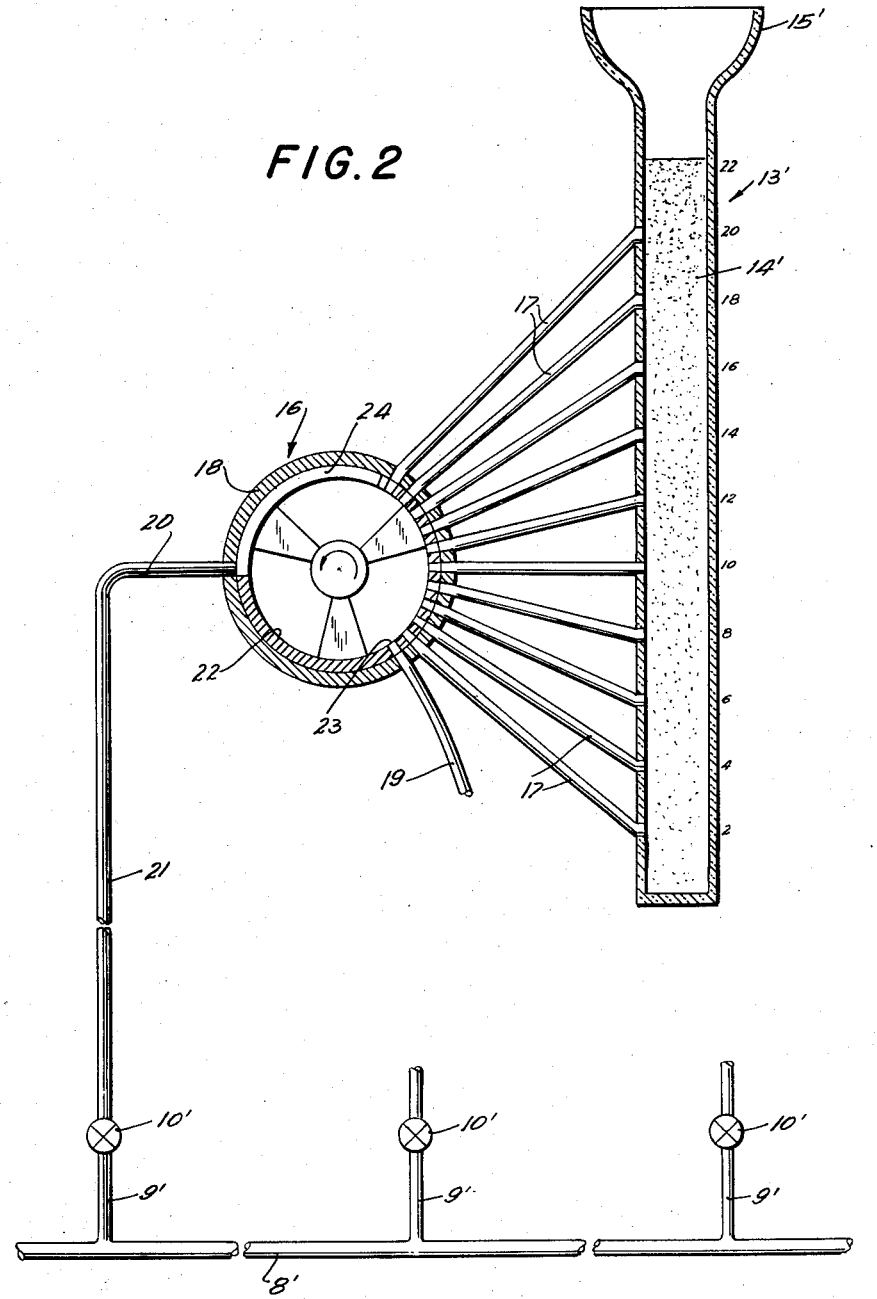

United States Patent Office 2,837,912
Patented June 10, 1958

2,837,912

APPARATUS FOR THE CHARACTERIZATION OF ODORS

Robert W. Moncrieff, Chichester, England, assignor to Airkem, Inc., New York, N. Y., a corporation of New York Application March 8, 1955, Serial No. 492,833

Claims priority, application Great Britain March 16, 1954

6 Claims. (Cl. 73—23)

This invention relates to a new apparatus for characterizing odors. More particularly the invention relates to an apparatus for characterizing odors wherein the selective adsorption of odors by a plurality of different adsorbent materials is utilized in the accumulation of odor characterizing data.

Various approaches to the characterization of odors heretofore available have been primarily subjective in nature, depending upon the sensitivity of the nose to obtain descriptive characterizations of the quality and intensity of odors and to express differences and distinctions between odors. The differences in olfactory sensitivity in individuals and the problem of olfactory fatique are but two of the factors which point up the gross inadequacy of subjective methods for the characterization of odors. To date, however, the perfume and odor counteractant industries and others interested in the characterization of odors have had to rely on professional "sniffers" or "odor juries" who have developed the art of smelling in much the same way as tea-tasters and liquor-samplers have developed their special arts.

In accordance with the present invention it has now been discovered that different odors respond in different characteristic ways to different adsorbent materials, and that by contacting odorous vapors in accordance with standardized procedures with a plurality of different adsorbents it is possible to derive data of a purely objective nature which is characteristically different for different odors and essentially constant for any particular odor. The different behavior of odors with respect to adsorbent materials can be ascertained in various ways, as for example by measuring the percentage of its own weight of odorant material than an adsorbent will pick up, the change in concentration of odorant in odorized air passing through an adsorbent bed, and the like. For practical reasons of speed and ease of manipulation, characterizing data can readily be based on the time of contact necessary for the adsorbent, in large excess, just to deodorize odorized air. This measures inversely the affinity of the particular adsorbent for an odor, or in other words, measures the speed at which the adsorbent is capable of removing an odorant from odorized air.

The critical time of contact (as it will hereinafter be referred to) can range from a very short time, in instances where the adsorbent may have an especially great affinity for the odorant material, to an infinitely long time where the adsorbent material is essentially a non-adsorbent for a particular odorant material. For the purposes of this method it is considered preferable to select adsorbent materials with which most odorant materials will exhibit a critical contact time somewhere within the range of about 0.04 to 1.0 sec.

The number of different adsorbent materials to employ in utilizing this odor-characterizing method will depend upon the degree of characterization that is desired. Extensive experiments have been conducted as hereinafter described using five different adsorbent materials, but in some instances as few as three adsorbents might be suitable whereas for more complete characterization and particularly for distinguishing between closely related odors the use of as many as 8 to 10 adsorbents might be desirable.

For purpose of illustration I have shown in the drawing typical apparatus for carrying out the present invention in which various parts of the apparatus are identified by suitable reference characters in each of the views and in which:

Fig. 1 is a diagrammatic view of a typical overall apparatus showing one type of tube for retaining adsorbent material, and Fig. 2 is an enlarged diagrammatic view of a modified form of adsorption tube for use in the apparatus shown in Fig. 1.

The apparatus used for measuring critical contact time is relatively simple and has been shown in Fig. 1 of the drawing as including a suitable source of air under pressure such as a blower 1 which feeds air through a pressure regulating valve 2 to a flow meter 3 for accurately determining the rate of air circulation. Air discharged from the flow meter through a connecting line 4 is passed to a mixing chamber 5 containing an odorant material 6 from which odorous vapors are picked up and passed through a discharge 7 to a manifold 8 having a plurality of side arms 9 each provided with separate shut-off valves 10. The mixing chamber 5 is suitably encased in a water bath or other temperature regulating medium 11.

The side arms 9 are provided at the free ends thereof with socket parts 12 for receiving adsorption tubes 13, the junction between the tubes 13 and socket 12 being of the ball socket type or other suitable gas-tight coupling. The tubes 13 are of uniform internal cross-sectional dimension and are packed to a suitable height as hereinafter described with different adsorbent materials 14. The upper ends 15 are suitably flared or otherwise fashioned to provide a locus for the detection of odorant in the effluent air stream.

In this apparatus the contact time through a bed of adsorbent which is "$n$" centimeters long and "$a$" square centimeters in cross-sectional area with an air flow of "$x$" cubic centimeters per second will be the fraction $$\frac{na}{x} \text{ sec.}$$

In the experiments hereinafter described adsorbent beds have been employed with a cross-sectional area of 0.5 sq. cm., and hence contact time of these experiments is determined by the fraction $$\frac{n}{2x} \text{ sec.}$$

The column of adsorbent material can be made readily detachable from the odorant air line to permit easy switching from one adsorbent to another, or if desired, a plurality of columns or tubes containing different adsorbents can be selectively placed in communication with the flow of odorant air by suitable adjustable valves. It should also be noted that fresh adsorbent material should be utilized for each determination in order that its adsorptive properties shall be uniform and not distorted by prior contact with the same or other odorant materials. In commercial adaptation of the method and apparatus carefully standardized adsorbent could be supplied in one-use disposable cartridges, similar to the tubes 13 and adsorbent 14 therein, which could be sealed units having ends removable to permit such units to be inserted in the apparatus acting as the adsorption bed or column above described. The careful standardization of adsorbents and of the technique employed in the method are important in making possible results which are reproducible from place to place and from time to time.

In utilizing the apparatus of the invention, air is passed through the system picking up odorant and carrying the mixture through the adsorbent material at a low rate, and under such conditions, assuming that the adsorbent will take up even small amounts of the odorant, none of the odorant will be present in the vapors discharged from the adsorbent. The rate of air flow is then gradually increased until a trace of odor is first detected in the discharging vapors. This point can be determined by the operator (or another) sniffing the discharged vapors or possibly by physical or chemical detecting means. The point at which odorant first is recognizable in the discharge vapors is the end point of the test, and reading the rate of air flow in cc./sec. and knowing the length and cross-sectional area of the adsorbent bed the critical contact time in seconds is readily calculated using the foregoing formula.

While it may be said that determining the end point by sniffing the discharge vapors is a subjective type of test, it is to be noted that the sniffer is called upon to determine but one thing, namely the appearance of an odor in the discharge vapors. This is quite in contrast to previous type odor tests where the subject was asked to determine and define factors such as tone, quality, intensity, and the like. The single act or function performed by sniffing in accordance with the method herein described has none of the complexities of previous type sniff tests, and since the nose is exposed only to very low intensity odors the matter of olfactory fatigue does not become a problem. Indeed it has been found that results are reproducible within a range of approximately plus or minus 20% while manually operating the control and rate of increase of air flow. If the latter controls are uniform and automatic to eliminate the human variation indications are that the test results might well be reproducible within a range of plus or minus 5 to 10%. It should also be noted that determining the end point in the test by sniffing is particularly advantageous for its manipulative ease and rapidity.

Other factors which affect the reproducibility of results include temperature and pressure at which the determinations are made. For purposes of standardization and reproducibility it would be preferable to make determinations of critical contact time in a room or environment having temperature, pressure, and relative humidity adjusted to predetermined standard levels.

In testing a considerable number of odorous materials using the method and apparatus of the present invention, characterizing data derived from tests with 5 different adsorbents, which might be referred to as 5 unit odor indices, have been surprisingly distinct and yet significantly similar in instances where odors are similar to the human observer. In fact the results thus far appear to bear out the theory that the main olfactory process may be one of differential adsorption by different receptor centers in the nose. It is known for example, that adsorption processes are exothermic in nature and the heat energy given out by adsorption at receptor centers could constitute the energy necessary for stimulation of the olfactory nerve.

All materials having adsorbent properties are potentially useful in carrying out the method of the present invention. In selecting a group of adsorbents to use for odor characterization, however, it is important that the different adsorbents be dissimilar in their adsorbent characteristics. Thus for example the five adsorbents used in the experimental procedures hereinafter described include activated charcoal, silica gel, activated alumina, activated fuller's earth, and vegetable fat supported on a carrier. This list could be supplemented, however, by various other adsorbents including ion exchange resins of the anionic, cationic, or non-ionic type. It is important, however, in selecting a group of adsorbents for a standardized numerical evaluation or characterization of odors to select adsorbents having definite adsorption properties, particle size, and the like, which can be reproduced from one batch to another in much the same manner that Raney nickel and other specially prepared catalysts can be reproduced from time to time.

In deriving odor indices from the determinations of critical contact time a predetermined range of contact times such as the range of 0.04 to 1.0 sec. above mentioned is preferably logarithmically divided into ten portions represented by integers 0 to 9 so that each odor index using a number of adsorbents "$n$" will be a number made up of "$n$" digits. For example, with 5 adsorbents odor indices could fall anywhere within the range 00000 to 99999. While 5 adsorbents thus permit a maximum of 100,000 possible odor indices it will be evident that increasing the number of adsorbents to 10 could increase the theoretical number odor indices to 10 billion. The use of this many adsorbents would hardly be necessary in the general application of the method to the characterization of odors, but the number would probably not be excessive in instances when the method might be used in more critical testing, as for example, determining whether two odorous materials of a complex nature are from the identical source.

The following description of experimental procedures and results will serve to show how the method and apparatus in accordance with the present invention can be utilized, but it is to be understood that this disclosure of experimental procedures and results is given by way of illustration and not of limitation.

*Experimental procedure and apparatus*

A number of odor characterizations are conducted in apparatus comprising an electrically driven air-blower calibrated to deliver air at rates of 10–40 cc. per sec. The air stream is passed through a 6 oz. bottle containing 15 ml. of odorant material (the air being blown over the odorant material) and thence upward through a glass tube of 0.5 sq. cm. internal cross-section which is graduated from the bottom upwards in cm. The graduated tube is packed to a height of "$n$" cm. with adsorbent material.

In operation the upper end of the graduated tube is inserted into one nostril (of the operator or an observer), the blower is started at its minimum speed, and the air speed is gradually increased until the smell of the odorant material is just unmistakably recognizable at the outlet of the graduated tube. This point, which is generally reached within about 20–30 sec., is the end of the determination, and from the final air speed "$x$" cc. per sec. and the height "$n$" cm. of the adsorbent material the critical contact time (knowing the adsorbent to have a cross-section of 0.5 sq. cm.) is $$\frac{n}{2x} \text{ sec.}$$

In these determinations the following adsorbent materials are used:

(1) Activated charcoal supplied by Sutcliffe Speakman & Co. Ltd., Leigh, Lancs. Quality 208 C., a type recommended for general deodorizing. 6–10 mesh.

(2) Silica gel supplied by Silica Gel Ltd., London. A type recommended for drying and conditioning air. 6–8 mesh.

(3) Activated alumina supplied by Peter Spence & Sons Ltd., Widnes. Type "A." 4–8 mesh.

(4) Activated fuller's earth supplied by Attapulgus Minerals and Chemicals Corporation, Philadephia. Grade "A" R.V.M. 6–8 mesh.

(5) Vegetable fat. National "Special" margarine was melted over near-boiling water, cooled and the solid fat removed. Some of this was melted and mixed with three times its own weight of activated alumina 8–16 mesh, by which it was well absorbed. The alumina acted purely and simply as a vehicle or holder for the fat.

*Experimental results*

The experimental results are given in full for the series of observations made with oil of lemongrass and with n-butanol, the first two odorant materials to be used. The detailed experimental observations enable the spread of the separate observations to be assessed. The spread was much the same with the other odorants.

One point that requires explanation is the unevenness of the steps between different heights of the adsorbent column in successive experiments. This arises from the fact that the column was partly filled at the start of each experiment, and its filled height was not read until after the critical air speed had been observed. When the observer did not know the height of the adsorbent column, he correspondingly did not know at what air speed (in his second and subsequent observations) to expect the appearance of odor. It was found in practice that this increased the reliability of the results and accordingly the height of adsorbent column was not observed until after the smelling test had been made. For this reason, there was no convenient opportunity to space out the adsorbent column heights for different observations with equal difference.

Using oil of lemongrass, which has a very high content of citral and a powerful lemon-like odor, as the odorant material, the results obtained were as shown in Table 1.

When n-butanol was used as the odorant material, the observed results were as shown in Table 2.

TABLE 2

| Adsorbent | Height of adsorbent column (cm.) | Air speed at which butanol odor was first clearly recognizable (cc./sec.) | Critical time of contact of odorized air with adsorbent (sec.) | Mean critical time of contact (sec.) |
|---|---|---|---|---|
| Activated carbon | 2.0 | 13 | 0.077 | |
| Do | 2.3 | 15.5 | 0.074 | |
| Do | 2.8 | 15 | 0.093 | 0.079 |
| Do | 4.3 | 26 | 0.083 | |
| Do | 5.4 | 40 | 0.068 | |
| Silica gel | 2.6 | 15 | 0.087 | |
| Do | 2.2 | 14 | 0.100 | |
| Do | 4.6 | 38 | 0.061 | 0.086 |
| Do | 4.8 | 27 | 0.089 | |
| Do | 5.0 | 27 | 0.098 | |
| Activated alumina | 4.0 | 10 | 0.200 | |
| Do | 4.8 | 13 | 0.184 | |
| Do | 10.0 | 27 | 0.184 | 0.218 |
| Do | 12.7 | 24.5 | 0.260 | |
| Do | 15.0 | 36 | 0.210 | |
| Activated fuller's earth | 2.2 | 17 | 0.065 | |
| Do | 3.0 | 19 | 0.079 | |
| Do | 3.8 | 35 | 0.054 | 0.063 |
| Do | 4.4 | 39 | 0.056 | |
| Do | 4.7 | 40 | 0.059 | |
| Vegetable fat | 24 | 10 | >1.0 | (¹) |

¹ Not an effective adsorbent.

In a similar way the critical contact time for eleven other materials with the same five adsorbents were measured. The results, including those for oil of lemongrass and n-butanol were as shown in Table 3.

TABLE 3

| Odorant | Type of odour | Critical time of Contact (sec.) with— | | | | |
|---|---|---|---|---|---|---|
| | | Activated carbon | Silica gel | Activated alumina | Activated Fuller's earth | Vegetable fat |
| Amyl alcohol | Fusel oil | 0.117 | 0.106 | 0.338 | 0.096 | >1 |
| Butyl alcohol | Spirituous bitter | 0.079 | 0.086 | 0.218 | 0.063 | >1 |
| Carbon tetra-chloride | Spirituous sweetish | 0.119 | 0.263 | 0.800 | >1 | >1 |
| Allyl caproate | Pineapple | 0.126 | 0.110 | 0.297 | 0.173 | 0.603 |
| Ethyl acetate | Fruity | 0.142 | 0.110 | 0.280 | 0.258 | >1 |
| Ethyl lactate | Fruity, rum | 0.081 | 0.062 | 0.273 | 0.106 | >1 |
| Methyl salicylate | Wintergreen | 0.078 | 0.106 | 0.331 | 0.166 | 0.381 |
| Carbon disulphide | Spitituous, nauseous | 0.281 | 0.507 | >1 | >1 | >1 |
| Pyridine | Rank, repulsive | 0.133 | 0.129 | 0.487 | 0.500 | 0.789 |
| Acetone | Spirituous sweet | 0.242 | 0.170 | 0.590 | 0.863 | >1 |
| Oil of lemongrass | lemon-like aromatic | 0.212 | 0.129 | 0.265 | 0.254 | 0.452 |
| Onions | Onions | 0.059 | 0.153 | 0.730 | 0.994 | >1 |
| Faeces | Faecal nauseating | 0.059 | 0.080 | >1 | >1 | >1 |

TABLE 1

| Adsorbent | Height of adsorbent column (cm.) | Air speed at which lemongrass odor was first clearly recognizable (cc./sec.) | Critical time of contact of odorized air with adsorbent (sec.) | Mean critical time of contact (sec.) |
|---|---|---|---|---|
| Activated carbon | 5.0 | 11.5 | 0.217 | |
| Do | 6.0 | 17 | 0.177 | |
| Do | 7.5 | 15.5 | 0.242 | 0.212 |
| Do | 10.5 | 27 | 0.195 | |
| Do | 12.5 | 27 | 0.031 | |
| Silica Gel | 3.0 | 12.5 | 0.120 | |
| Do | 4.0 | 18.5 | 0.108 | |
| Do | 5.0 | 21 | 0.119 | 0.129 |
| Do | 7.5 | 24.5 | 0.157 | |
| Do | 8.0 | 28 | 0.143 | |
| Activated alumina | 10.5 | 22 | 0.239 | |
| Do | 16.1 | 27 | 0.296 | |
| Do | 19.0 | 35 | 0.272 | 0.265 |
| Do | 19.3 | 40 | 0.241 | |
| Do | 19.5 | 35 | 0.278 | |
| Activated fuller's earth | 7.7 | 14.5 | 0.265 | |
| Do | 8.6 | 17.5 | 0.247 | |
| Do | 10.0 | 21 | 0.238 | 0.254 |
| Do | 13.4 | 25 | 0.268 | |
| Do | 15.0 | 30 | 0.250 | |
| Vegetable fat | 12.0 | 16.5 | 0.364 | |
| Do | 12.1 | 15 | 0.403 | |
| Do | 12.4 | 14 | 0.443 | 0.452 |
| Do | 12.8 | 12 | 0.533 | |
| Do | 15.5 | 15 | 0.517 | |

In those cases where the critical time of contact exceeds 1 second it is preferred simply to say that the adsorbent is not effective against that particular odorant; it is very unlikely that such a slow process would bear any relation to those processes which accompany olfaction, because smells are usually perceived either quickly or not at all. The lowest critical time of contact is about 0.059 sec., and the highest of which we are taking cognisance is 1 sec. It will be convenient to arrange times within this range on levels which we can denote by the integers 0 to 8, reserving 9 for those times in excess of 1 second. Further, it will be more realistic to have these levels so that they bear a logarithmic ratio to each other rather than an arithmetical one. This can be done conveniently if the increment between one odor level and the next is 37 percent, so that 0 represents critical times of contact from 0.059–0.081
1 represents critical times of contact from 0.082–0.111
2 represents critical times of contact from 0.112–0.152
3 represents critical times of contact from 0.153–0.208
4 represents critical times of contact from 0.209–0.285
5 represents critical times of contact from 0.286–0.390
6 represents critical times of contact from 0.391–0.534
7 represents critical times of contact from 0.535–0.732
8 represents critical times of contact from 0.733–1
9 represents critical times of contact higher than 1 second Any contact time of contact lower than 0.059 which may be observed will be included in group 0.

Using this notation we can write the critical time of adsorption (as determined by odor test) for amyl alcohol as 2 on activated carbon
1 on silica gel
5 on activated alumina
1 on activated fuller's earth
9 on vegetable fat or we can use the number 21519 to characterize its adsorption properties as determined by odor test. Similarly the information contained in Table 3 can be re-written as shown in Table 4.

TABLE 4

| | | | | | |
|---|---|---|---|---|---|
| Amyl alcohol | 2 | 1 | 5 | 1 | 9 |
| Butyl alcohol | 0 | 1 | 4 | 0 | 9 |
| Carbon tetrachloride | 2 | 4 | 8 | 9 | 9 |
| Allyl caproate | 2 | 1 | 5 | 3 | 7 |
| Ethyl acetate | 2 | 1 | 4 | 4 | 9 |
| Ethyl lactate | 0 | 0 | 4 | 1 | 9 |
| Methyl salicylate | 0 | 1 | 5 | 3 | 5 |
| Carbon disulphide | 4 | 6 | 9 | 9 | 9 |
| Pyridine | 2 | 2 | 6 | 6 | 8 |
| Acetone | 4 | 3 | 7 | 8 | 9 |
| Lemongrass oil | 4 | 2 | 4 | 4 | 6 |
| Onions | 0 | 3 | 7 | 8 | 9 |
| Faeces | 0 | 0 | 9 | 9 | 9 |

These figures are indicative of adsorption characteristics and could not from previous knowledge have been said to have been indicative of smell properties. If, however, adsorption does play an important part in the experience of olfaction, as it is believed to do, then it is very likely that the figures given in Table 4 will be indicative not only of adsorption characteristics but also of odor characterization. However, in fact, do they appear when viewed in this light?

Firstly, all the odorants have different smells and all have different numbers. Conversely all substances that have different numbers, have different smells. Secondly, there are two pairs of substances with somewhat similar smells and with not very dissimilar numbers; thus amyl and butyl alcohols both have fusel oil bitter type odors and their odor characteristic numbers are:

2 1 5 1 9—amyl alcohol
0 1 4 0 9—butyl alcohol these betraying a family resemblance. Then again, allyl caproate 2 1 5 3 7 and ethyl acetate 2 1 4 4 9 both have simple fruity smells and both again have odor characteristic numbers which are not very dissimilar. Thirdly, the unique nature of the characteristic number 4 6 9 9 9 of carbon disulphide which has a quite unique and nauseating smell is reassuring; so, too, is the unique nature of the faeces number 0 0 9 9 9.

*Adsorption characteristics of chemically unrelated substances with similar odor*

But although the odor characteristic number of butyl and amyl alcohols were not very dissimilar, it has to be remembered that these two substances are very closely related in chemical constitution. Again, although allyl caproate and ethyl acetate both possess fruity odors and both had somewhat similar adsorption characteristics, there was once again a close, even if not quite so close, chemical resemblance in that both were esters. The question as to whether the similarity of adsorption characteristics was due to similarity of chemical constitution or to similarity of smell really remained open. It was thought that a crucial test to resolve this question would be to examine the adsorption characteristics of two substances which had similar smells but which were very unlike in chemical constitution.

*Musk and ambrette musk.*—The pair of substances chosen for this test was natural tonquin musk and ambrette musk. The natural musk was in the form of grains and was the dried secretion from the male musk-deer. As has been shown by Ruzicka Helv. chim. Acta., 1926, vol. 9, pages 230, 716, 1008, the essential principle of musk is 3-methyl-cyclopentadecanone.

This macrocyclic ketone, known as muscene, constitutes from ½ to 2 percent of natural musk.

Musk is an essential constituent of most perfumes but natural musk is so expensive and rare that a number of synthetics which have odors very similar to that of natural musk are manufactured. One of the most popular of these is ambrette musk which was shown by Zeide and Dubinin, J. Gen. Chem. USSR, 1932, vol. 2, page 455, to be 1-methyl-2:6-dinitro-3-methoxy-4-tert-butylbenzene

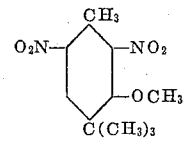

In chemical constitution it could hardly be more remote from muscone, and yet its smell is very similar to, although certainly not quite the same as, that of natural musk.

When trials with these two substances were made along the lines already described, the smell of the odorized air, i. e., of the air that had been passed over either the musk grains or the crystalline ambrette musk was not instantly recognizable. Although musks of all kinds have extremely persistent smells, these smells are not very intense, because the musks have extremely low vapor pressures; those of both muscone and ambrette musk are of the order of only 0.001 mm. mercury. In order to intensify their odors, so that measurements could be made easily it was necessary to raise their vapor pressures and this was done by warming them. The bottle containing either of the musks was immersed in a water-bath at 55° C.; this greatly increased the vapor pressure of the musk and the odor in the air that had been blown over it was thereby rendered so intense that there was no difficulty at all about detecting the appearance of the odor.

Results obtained were as shown in Table 5.

TABLE 5

| Odorant | Critical time of Contact (se.) with— | | | | |
|---|---|---|---|---|---|
| | Activated carbon | Silica gel | Activated alumina | Activated fuller's earth | Vegetable fat |
| Natural musk | ≥1 | ≥1 | ≥1 | ≥1 | ≥1 |
| Ambrette musk | ≥1 | ≥1 | ≥1 | ≥1 | ≥1 |

The surprising result emerged that in neither case was any of the five adsorbents used effective. In other words, musk, whether natural or "ambrette," cannot be at all efficiently adsorbed by activated carbon, silica gel, activated alumina, activated fuller's earth or vegetable fat. Here were two substances unrelated in every way except in similarity of smell, which showed the most unusual and unexpected resistance to adsorption. When it is remembered that the odor of natural musk is designed to attract animals of the opposite sex from a distance of some miles, and when the very low vapor pressure of musk itself is recalled, it is clear that the vapor must be in an extremely tenuous form when it is perceived by the female deer. If musk vapor could easily be adsorbed e. g. on timber, on leaves, or on minerals, it would have very little chance to spread and still to be perceptible over the very large areas that it undoubtedly is. Perhaps the resistance of musk to adsorption is a provision on the part of nature to ensure that its warning odorant molecules shall have a chance to reach the appropriate animals even at considerable distances.

There was, however, one point to check. Whereas the measurements shown in Table 3 had been made with the odorant material in every case at room temperature, these later measurements with musk had been made with the odorant at about 50–55° C. A check run was therefore made with butyl alcohol at 55° C. and it was found that both activated carbon and silica gel would completely adsorb it without difficulty. It should be noted that although the odorant material was kept at an elevated temperature, the air that was passed over it was in the heated bottle for only such a relatively short time that it was not appreciably warmed.

So far as concerned the behaviour of the two musks, the results were unexpected, but they did confirm, so far as they showed anything at all, that behaviour towards adsorbent was similar if smell was similar, irrespective of different chemical constitution. In view, however, of the abnormal resistance of the musks to adsorption, it seemed all the more necessary to make a comparison of the adsorbent properties of two other odorants with similar smells but dissimilar chemical constitution.

*α-Ionone and methyl octine carboxylate.*—Both α-ionone and methyl octine carboxylate have powerful violet odors; these are not quite the same, but they do have a very obvious similarity when smelled. Their chemical constitutions are very different: α-ionone is a ketone with a ring structure

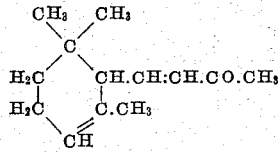

whereas methyl octine carboxylate is a straight chain ester

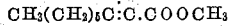

Both substances have relatively high vapor pressure and there was no difficulty at all about making adsorption tests with them at room temperature. Using the method described in this paper, their critical times of contact with five different adsorbents were ascertained and were as shown in Table 6.

TABLE 6

| Odorant | Activated carbon | Silica gel | Activated alumina | Activated fuller's earth | Vegetable fat |
| --- | --- | --- | --- | --- | --- |
| α-Ionone | 0.086 | 0.084 | 0.145 | 0.115 | 0.700 |
| Methyl octine carboxylate | 0.150 | 0.106 | 0.199 | 0.125 | 0.465 |

It is at once evident that there is a considerable degree of correspondence in the critical times of adsorption of α-ionone and methyl octine carboxylate towards the five adsorbents used for test. If these critical times are converted to the logarithmic scale shown at bottom of column 6, we obtain:

α-Ionone—1 1 2 2 7
Methyl octine carboxylate—2 1 3 2 6 which again demonstrates the similarity but not identity of adsorption characterization. Inasmuch as the odors of α-ionone and of methyl octine carboxylate are somewhat similar but not exactly the same, the agreement is reasonable, and supports the thesis that the adsorption behaviour of an odorant material is more closely related to the quality of its odor than to its chemical constitution.

One cannot but observe the very low critical time of contact which both of these violet smelling compounds have for four of the five adsorbents used; of all the odorant materials used in this work they are much the most easily adsorbed and it seems likely that this very rapid adsorption may well be the cause of the familiar evanescence or fleeting nature of the violet perfume.

In addition to providing a means for the systematic classification of odors for identification purposes, the method and apparatus of the present invention can be utilized in combating many of the odor problems in industry. For example, objectionable odors may be tested in the field by means of a portable apparatus and the characterizing data relayed to a central laboratory for purposes of identifying and/or developing a suitable counteractant for the odorous material. When the odorant material itself may be inaccessible the apparatus can be utilized without an intermediate mixing chamber by merely picking up the air-odorant mixture with the blower and feeding the mixture at a controlled variable rate to adsorbents used in the test. Other uses and adaptations of the invention will readily occur to those versed in the odor formation and odor counteractant arts.

An alternative method of testing which might be more convenient in practice would be to have the rate of air flow constant, and to have the column of adsorbent tapped with air inlets at different heights. These tappings would be connected to a multi-way tap, and during testing the tap would be turned so that odorized air was first fed to the bottom of the column, then to a point one-tenth up its height, then to another two-tenths high and so on, until the odorant was recognizable in the air issuing from the top of the tube. The position of the adjustable tap or switch would give an indication of the critical time of contact of the odorant with the adsorbent.

I have shown in Fig. 2 of the drawing a modified form of adsorption tube for use in the alternative method of testing above-mentioned. For the sake of simplicity details of a single tube 13' are shown in association with a manifold 8' having a plurality of side arms 9' with separate shutoff valves 10' similar to the correspondingly numbered parts in Fig. 1 of the drawing. It will be understood that a number of tubes 13' will be employed, depending upon the number of different adsorbents to be employed in a particular test procedure. Thus in the apparatus shown in Fig. 1, employing the modified form of adsorption tube, there would be four of the adsorption tubes 13' as shown in Fig. 2.

The tube 13' is connected with a control valve 16 through a plurality of tubes 17 entering the tubes 13' at uniformly spaced intervals from the closed bottom of the tube and from each other. For purpose of illustration the tubes 17 have been indicated as entering the tube 13' at intervals respectively of 2, 4, etc. to 20 cm. from the bottom of the tube in which event the upper surface of adsorbent material 14' would be 22 cm. from the bottom of the tube.

The valve 16 is a special cylindrical type valve having an outer casing 18 having in addition to ports registering with the tubes 17 an additional port registering with a waste or discharge line 19 and an inlet 20 which is connected by a tube 21 to the header 8' through shut-off valve 10'.

The inner rotatable part 22 of the valve 16 is provided with an aperture 23 adapted to selectively communicate with the waste or discharge tube 19 or one of the tubes 17, and is further provided with an elongated aperture 24 establishing continuous communication with the inlet 20 as the aperture 23 is moved to communication with different tubes 17 and 19.

In taking measurement with the modified tube 13' and valve 16 the odorant air is fed at a constant rate with the valve 16 adjusted to pass the circulated air through the discharge line 19. This feed and discharge through the line 19 is continued for about ½ minute to completely displace air within the apparatus. Then the movable valve part 22 is slowly rotated in a counter-clockwise direction as shown in the drawing to establish communication successively with tubes 17 running first to the 2 cm. position on tube 13', then to the 4 cm. position, then to the 6 cm. position, and so on progressively until the odorant is recognized by the nose at the upper end 15' of the tube 13'. The rate of rotation of the inner valve part 22 is suitably such as to permit the odorant air mixture to be introduced from 1 to 2 seconds at each successive level in the tube 13'. When the odorant is detected rotation of the valve part 22 is stopped and the setting when stopped indicates the point of introduction of odorant in the column of adsorbent material 14' at which break-through of the odorant has occurred. The distance from such point of introduction in the column of adsorbent 14 to the top of the column then becomes the component "$n$" in the formulas previously discussed. Thus, for example, if break-through occurs at the 14 cm. position on the tube 13' $n$ will be 22 minus 14 or 8 cm.

While the procedure above described of rotating the valve member 22 at a slow uniform rate until a point of break-through is reached will give generally reliable results, it may be desirable in some instances to recheck the break-through point which might be referred to as a height "$h$" on the tube 13' by filling the tube with fresh adsorbent material 14' and repeating the procedure except that the valve part 22 is moved immediately from the discharge line 19 to establish communication with the tube 17 connecting with the adsorption tube 13' at height "$h$." The odorant should then be detected at the upper end of 15' of the tube within a definite short time interval such as 2 seconds. By then repeating such tests with immediate adjustments of the movable valve part 22 to connect with adsorption to 13' at heights ($h+2$ cm. or $h-2$ cm. and the like) it will be evident that a very precise determination of the point of break-through can be determined.

Various changes and modifications in the method and apparatus herein described will occur to those skilled in the art and to the extent that such changes and modifications are embraced by the appended claims, it is to be understood that they constitute part of my invention.

I claim:

1. A device for the characterization of odors comprising at least three adsorption tubes of identical size and dimensions, each of said tubes containing predetermined amounts of a different adsorbent material in particled form, the particle size and other physical and chemical properties of each adsorbent material corresponding to predetermined standards, means for passing an air stream at a measurable variable rate through said tubes of adsorbent material individually and selectively, means for introducing an odorant to said airstream, whereby said variable time of contact is measured by sensing the presence of odor in the effluent stream at the discharge end of said tubes.

2. A device for the characterization of odors as defined in claim 1 in which the number of tubes of different adsorbent material is five and the five adsorbent materials are activated charcoal, silica gel, activated alumina, activated fuller's earth, and vegetable fat supported on a carrier.

3. A device for the characterization of odors comprising at least three adsorption tubes of identical size and dimensions, each of said tubes containing predetermined amounts of different adsorbent material in particled form, the particle size and other physical and chemical properties of each adsorbent material corresponding to predetermined standards, means for passing an air stream through said tubes of adsorbent material individually and selectively, means for varying the time of contact of said air stream with adsorbent material in selected tubes, means for introducing an odorant to said air stream, whereby said variable time of contact is measured by sensing the presence of odor in the effluent stream at the discharge end of said tubes.

4. A device for the characterization of odors as defined in claim 3 wherein the means for varying the time of contact of said air stream with adsorbent material comprises a plurality of selective air stream inlets arranged longitudinally of said tubes for varying the amount of adsorbent material contacted by said air stream.

5. A device for the characterization of odors as defined in claim 3 wherein the adsorption tubes packed with different adsorbent materials comprise a set of cartridges detachably coupled with said device, and said set of cartridges conforming to rigid standards as to dimensions, quantity of adsorbents and physical and chemical properties thereof, whereby reproducible odor characterizing data can be obtained from one set to another of said cartridges.

6. A device for the characterization of odors as defined in claim 3 wherein the tubes of adsorbent material have an inside diameter of 0.5 sq. cm., whereby contact time is determined by the fraction $$\frac{n}{2x}$$

wherein $x$ is the height of the column of adsorbent in cm. and $n$ is the flow rate of the air stream in cubic centimeters per second.

References Cited in the file of this patent

UNITED STATES PATENTS 2,136,844     Fair et al.  ------------ Nov. 15, 1938

OTHER REFERENCES

Book by R. W. Moncrieff, "The Chemical Senses," published by Leonard Hill Ltd.